(12) United States Patent
Tachiiri et al.

(10) Patent No.: US 10,054,975 B2
(45) Date of Patent: Aug. 21, 2018

(54) REMOTE CONTROL DEVICE MOVABLE STRUCTURE

(71) Applicant: DENSO CORPORATION, Kariya, Aichi-pref. (JP)

(72) Inventors: Motoki Tachiiri, Nagoya (JP); Yasuhiko Yamazaki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 14/758,672

(22) PCT Filed: Dec. 19, 2013

(86) PCT No.: PCT/JP2013/007453
§ 371 (c)(1),
(2) Date: Jun. 30, 2015

(87) PCT Pub. No.: WO2014/118858
PCT Pub. Date: Aug. 7, 2014

(65) Prior Publication Data
US 2015/0370282 A1    Dec. 24, 2015

(30) Foreign Application Priority Data

Jan. 30, 2013  (JP) .................................. 2013-15950

(51) Int. Cl.
*G05G 1/02*        (2006.01)
*G05G 5/05*        (2006.01)
(Continued)

(52) U.S. Cl.
CPC ............... *G05G 1/025* (2013.01); *G05G 1/02* (2013.01); *G05G 5/05* (2013.01); *G06F 3/0338* (2013.01);
(Continued)

(58) Field of Classification Search
CPC combination set(s) only.
See application file for complete search history.

(56) References Cited

U.S. PATENT DOCUMENTS 5,589,828 A * 12/1996 Armstrong ......... G05G 9/04737
                                                              200/6 A
6,515,650 B2 * 2/2003 Arita ...................... G05G 9/047
                                                              345/156
(Continued)

FOREIGN PATENT DOCUMENTS

GB     2367348 A     4/2002
JP     2003-345509 A   12/2003
(Continued)

OTHER PUBLICATIONS

International Search Report and Written Opinion dated Feb. 25, 2014 in the corresponding International Application No. PCT/JP2013/007453 (with English translation).

*Primary Examiner* — Victor L MacArthur
*Assistant Examiner* — Joseph H Brown
(74) *Attorney, Agent, or Firm* — Posz Law Group, PLC

(57) ABSTRACT

A sliding portion of a slider slides on a sliding surface of a base. This slider is biased toward the base by a stabilizer formed by an elastic, small-diameter, rod-shaped member. Specifically, the stabilizer is formed by a center portion, a link portion, a spring portion, and an abutting portion. When the abutting portion abuts an abutting recess of a cover attached over the slider to be biased toward the base, the spring portion plastically deforms about an arc portion. Due to a resulting reaction force, a pressing portion formed by the center portion biases the sliding portion of the slider toward the base. Accordingly, play may be suppressed with a small number of components.

6 Claims, 5 Drawing Sheets

(51) Int. Cl.
  *G06F 3/0354* (2013.01)
  *G06F 3/0338* (2013.01)
(52) U.S. Cl.
  CPC ..... *G06F 3/03548* (2013.01); *Y10T 74/20732* (2015.01)

(56) References Cited

U.S. PATENT DOCUMENTS

| | | | | |
|---|---|---|---|---|
| 7,176,884 B2* | 2/2007 | Park | ................ | G06F 3/0338 345/156 |
| 7,301,111 B2* | 11/2007 | Kondo | ................ | H01H 25/002 200/4 |
| 7,439,461 B2* | 10/2008 | Sawada | ................ | G05G 5/05 200/4 |
| 7,636,081 B2* | 12/2009 | Takamoto | ................ | G05G 5/05 273/148 B |
| 8,692,770 B2* | 4/2014 | Itoh | ................ | G06F 3/0338 200/17 R |
| 2002/0097224 A1 | 7/2002 | Nishino et al. | | |
| 2007/0068785 A1* | 3/2007 | Lee | ................ | G05G 9/047 200/339 |
| 2011/0057909 A1 | 3/2011 | Itoh | | |
| 2012/0080294 A1 | 4/2012 | Ishikawa et al. | | |

FOREIGN PATENT DOCUMENTS

| | | | |
|---|---|---|---|
| JP | 2008-117710 A | 5/2008 | |
| JP | 2011-232793 A | 11/2011 | |

\* cited by examiner (a)

REFERENCE EXAMPLE (b)

REFERENCE EXAMPLE

REMOTE CONTROL DEVICE MOVABLE STRUCTURE

CROSS-REFERENCE TO RELATED APPLICATIONS

The present application is a U.S. national stage application of PCT/JP2013/007453 filed on Dec. 19, 2013 and is based on Japanese patent application No. 2013-015950 filed on Jan. 30, 2013, the content of which is incorporated herein by reference.

TECHNICAL FIELD

The present disclosure relates to a remote control device mounted on, e.g., a center console of a vehicle.

BACKGROUND ART

Remote control devices mounted on, e.g., a center console of a vehicle are known (see, e.g., Patent Literature 1). This type of remote control device improves the operability of on-board devices, such as on-board navigation units, for drivers. Specifically, a knob, which is sized to fit within the palm of a hand, is installed at an upper end. A driver may, for example, move the knob in various directions to control the movement of a cursor, and press down on the knob to select an operation.

In order to improve the operability of the remote control device, a structure is needed to suppress play between a moveable shaft and other components. For example, the knob may be attached to a slider which is movable in the X and Y directions. In this case, to suppress the play between the slider and the shaft, a structure is needed to bias the slider downward with respect to a base from which the shaft protrudes.

PRIOR ART LITERATURE

Patent Literature

Patent Literature 1: JP 2011-232793 A

SUMMARY OF THE INVENTION

However, conventionally, a large number of components are required to suppress the above described play. Accordingly, assembly requirements are increased. Further, if the number of components is large, it becomes necessary to increase the measurement precision of each component. As a result, manufacturing costs may be increased.

It is an object of the present disclosure to, in order to resolve the above points, provide a remote control device moveable structure, i.e., a movable structure for a remote control device, capable of suppressing play with a small number of components.

To achieve the above described object, a remote control device movable structure of the present disclosure includes a base, a slider, a cover, and a stabilizer.

The base includes a sliding surface at an upper portion thereof. A sliding portion of the slider slides on the sliding surface of the base. Further, the slider includes a fitting portion that stands on the sliding surface and fits together with a shaft protruding from the base. The cover is attached over the slider to allow the fitting portion to protrude.

The stabilizer is formed by an elastic, rod-shaped member. For example, it is contemplated that the stabilizer may be formed by a metal member. Here, when an abutting portion of the stabilizer abuts the cover so as to be biased by the cover toward the base, a spring portion connected to the abutting portion elastically deforms. Due to a reaction force resulting from the elastic deformation of the spring portion, a pressing portion connected to the spring portion biases the slider toward the base.

In other words, according to the present disclosure, by interposing a single component, i.e., the stabilizer, between the cover and the slider, the slider is pressed down toward the base. At this time, by suitably positioning the stabilizer, play resulting from the above described fitting portion tilting with respect to the sliding surface may be suppressed with a small number of components.

BRIEF DESCRIPTION OF THE DRAWINGS

FIG. 5(a) is a side view of the movable structure, and FIG. 5(b) is a cross sectional view of FIG. 5(a) along VB-VB.

EMBODIMENTS FOR CARRYING OUT INVENTION

Figure 1:
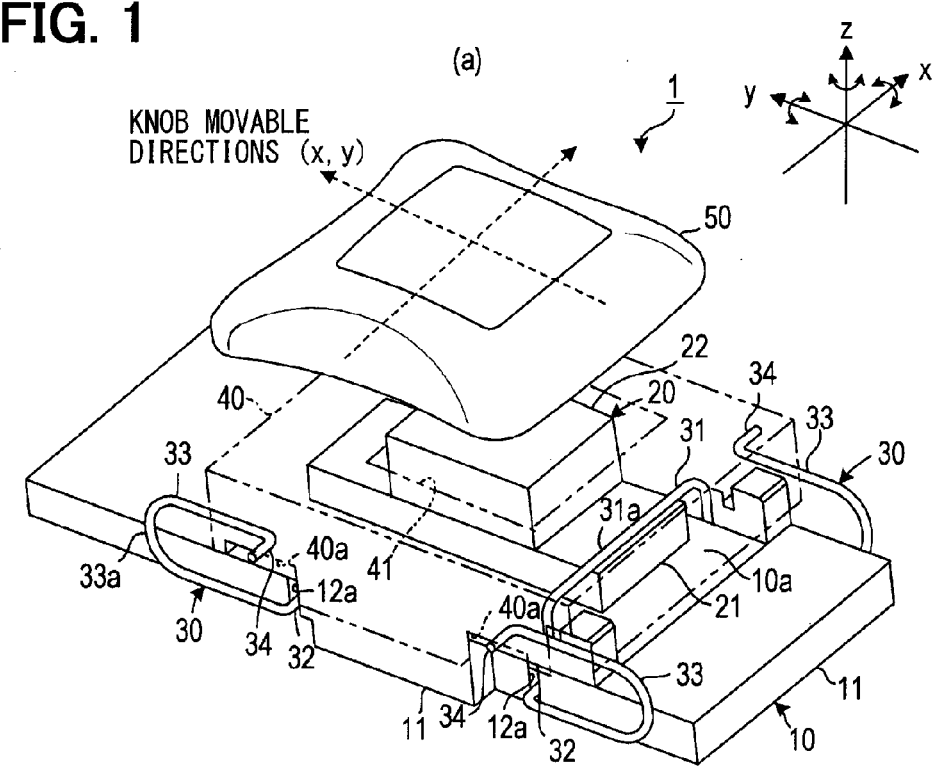
FIG. 1(a) is a perspective view showing an outline of a remote control device movable structure.
FIG. 1(b) is a side view of the same.
Figure 1:
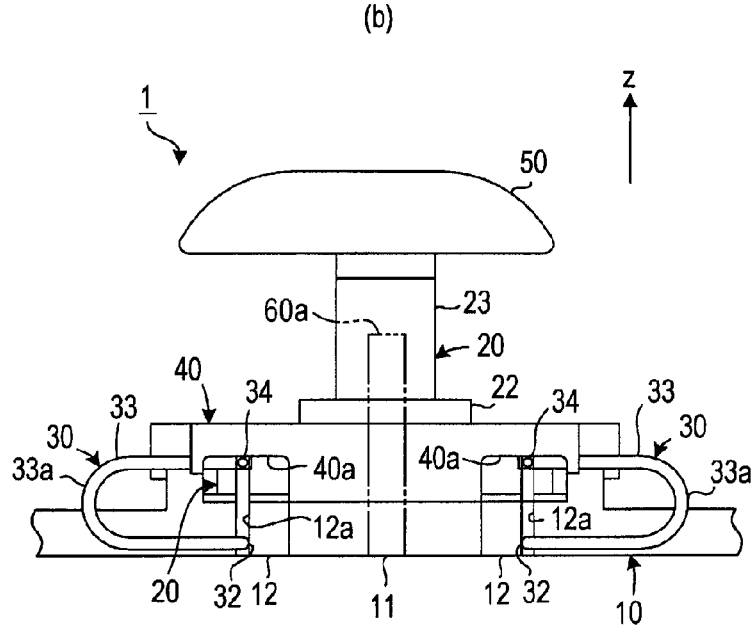

Hereinafter, a first embodiment of the present disclosure will be explained with reference to the drawings.

As shown in FIGS. 1(a) and 1(b), a remote control device movable structure 1 according to the present embodiment (hereinafter, "movable structure") includes a base 10, a slider 20, a stabilizer 30, a cover 40, and a knob 50. Further, in order to avoid excessively complicating the drawing of FIG. 1(a), a portion of the stabilizer 30 is omitted for brevity.

The base 10 is resin molded and is substantially rectangular solid shaped. Further, as shown in FIG. 1(a), the base 10 is widthwise in the X direction and lengthwise in the Y direction, and orthogonal to these directions is the Z direction, as will be explained below. Moreover, the pitch direction is defined about the X axis, the roll direction is defined about the Y axis, and the yaw direction is defined about the Z axis.

As shown in FIG. 2(b), the base 10 is attached to a device-fixing stand 60 by screws and the like. A pass-through opening (not illustrated) is formed at a center portion of the base 10. The pass-through opening allows a shaft 60a, which protrudes upward from the device-fixing stand 60, to pass therethrough. Further, as shown in FIG. 2(a), two sliding surfaces 10a are formed on either side of the pass-through opening in the Y direction, such that the pass-through opening is interposed therebetween. Additionally, FIGS. 2(a) and 2(b) show a state where the stabilizer 30 of one side is provided.

Further, as shown in FIGS. 2(a) and 2(b), the base 10 includes wall portions 11 which are rectangular solid shaped and project out from each side of the center portion of the base 10 in the X direction. Contact portions 12 extend from the wall portion in the Y direction, and extend downward in the Z direction to form fitting grooves 12a. The fitting grooves 12a have a width so as to weakly fit together with the stabilizer 30.

As shown in FIG. 2(a), the slider 20 is provided between two of the wall portions 11 of the base 10. The slider 20 is resin molded. As shown in FIGS. 2(a) and 2(b), the slider 20 includes a sliding portion 21 and a protrusion portion 22. The sliding portion 21 is plate-shaped and is lengthwise in the Y direction of the base 10. The protrusion portion 22 is rectangular solid shaped and projects upward from a center portion of the sliding portion 21. Further, a pass-through opening 22a, which allows the shaft 60a to pass therethrough, is formed at the center of the protrusion portion 22. The pass-through opening 22a is formed so as to penetrate the sliding portion 21. At the slider 20, the bottom surface of the sliding portion 21 contacts the sliding surfaces 10a of the base 10 so as to be slidable on the base 10. Two grooves 21a are formed on the top surface at each end of the sliding portion 21. The grooves 21a extend in the X direction and are joined with the stabilizer 30. Further, as shown in FIG. 1(b), the slider 20 has attached thereon a cylindrical portion 23 at the pass-through opening 22a of the protrusion portion 22. The cylindrical portion 23 is cylindrical shaped, encloses the shaft 60a, and is connected to the knob 50.

The stabilizer 30 is disposed along the X direction on the sliding surfaces 10a of the base 10. As shown in FIG. 3 and FIGS. 4(a) to (c), the stabilizer 30 is formed by bending a small-diameter, rod-shaped, metal member. The stabilizer 30 includes a center portion 31, link portions 32, spring portions 33, and abutting portions 34. The center portion 31 is substantially U-shaped. The link portions 32 project from each end of the center portion 31. The spring portions 33 are substantially U-shaped and are formed by folding back arc portions 33a. Further, the spring portions 33 extend in a direction orthogonal to a plane defined by the substantially U-shape of the center portion 31. The abutting portions 34 extend outward in the X direction from the tips of the spring portions 33. Additionally, the center portion 31 includes a pressing portion 31a and bending portions 31b. The pressing portion 31a extends in the X direction, and the bending portions 31b are bent at substantially right angles from the pressing portion 31a. Of note here, the pressing portion 31a and the abutting portions 34 are positioned coaxially (i.e., on the same straight line).

Figure 2:
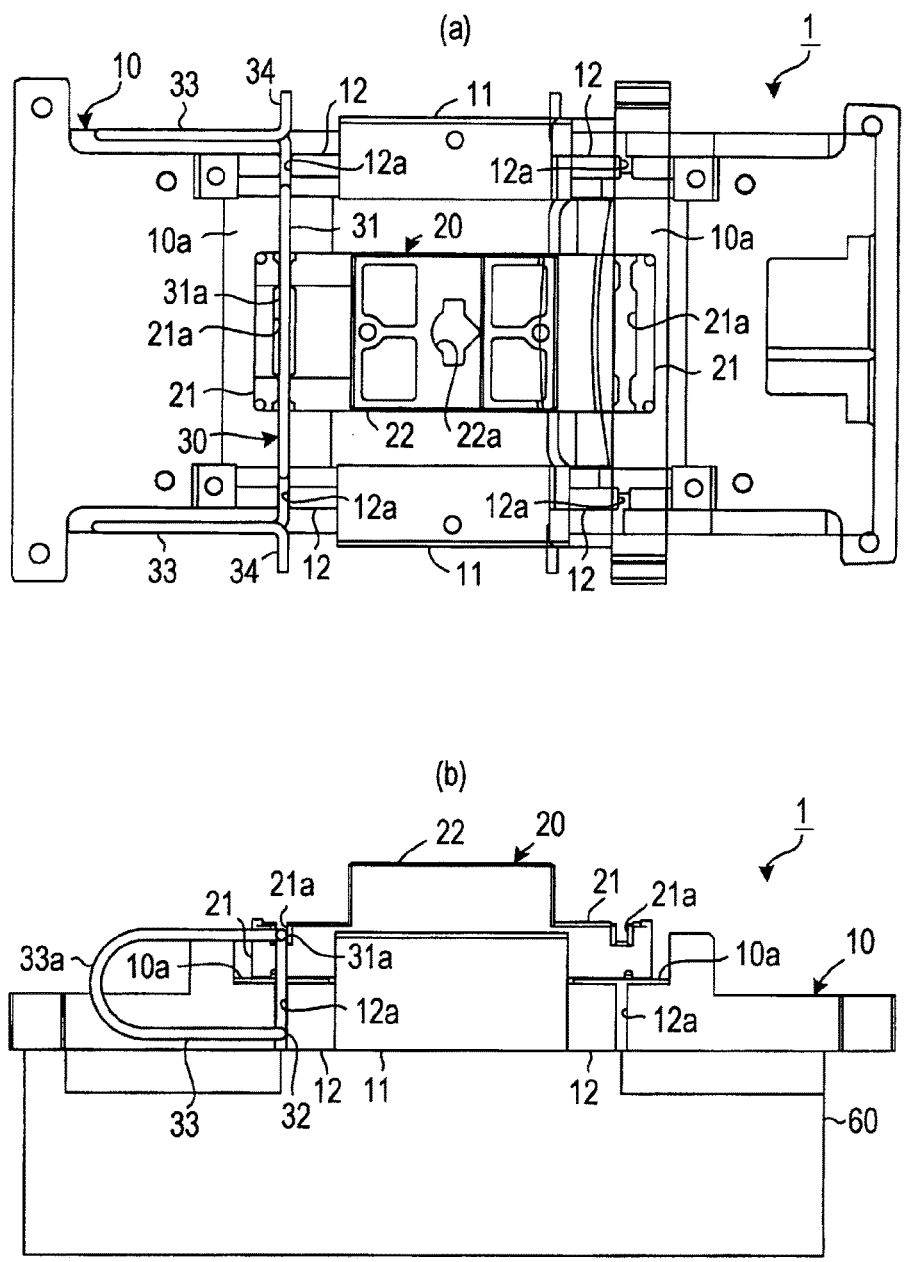
FIG. 2(a) is top view showing the remote control device movable structure with a cover detached.
FIG. 2(b) is a side view of the same.
Figure 3:
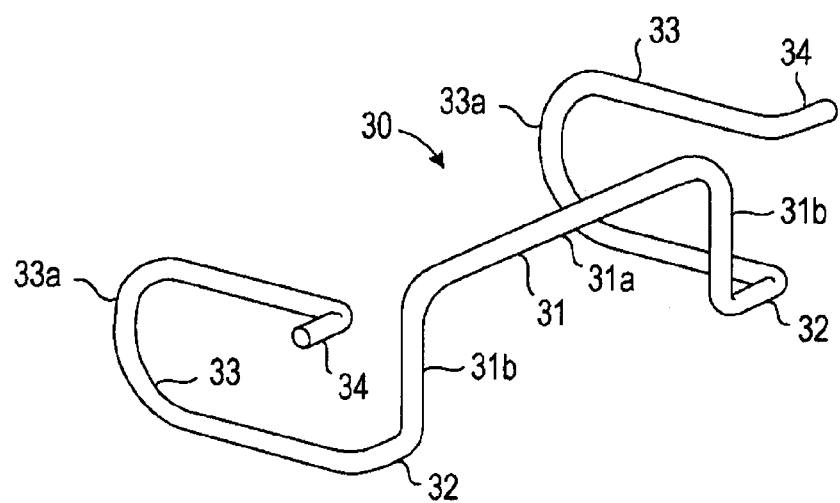
FIG. 3 is a perspective view showing a stabilizer constituting the remote control device movable structure.

The stabilizer 30 is arranged so that the link portions 32 are housed within the fitting grooves 12a formed by the contact portions 12 of the base 10 (see FIGS. 1 and 2). Further, the two ends of the sliding portion 21 of the slider 20 are positioned within the substantially U-shape of the center portion 31. Then, the pressing portion 31a is weakly fit together with the grooves 21a of the sliding portion 21 (see FIG. 2).

The cover 40 is a thin plate and is a box member with an open bottom. As shown in FIG. 1(a), a center opening 41 is formed in a center portion of the cover 40 to allow the protrusion portion 22 of the slider 20 to pass therethrough. The cover 40 is attached, with screws and the like, over the slider 20 with respect to the base to allow the protrusion portion 22 to protrude. The cover 40 includes four wall members which are formed upright, extending downward from a surface of the cover 40. Of these four wall members, the two wall members in the X direction include two abutting recesses 40a each. Accordingly, when the cover 40 is secured by screws, the abutting portions 34 of the stabilizer 30 abut, and are biased downward by, the abutting recesses 40a.

The knob 50 has a rounded top, and is substantially rectangular shaped when viewed from the top. The knob 50 is attached to an upper end of the cylindrical portion 23 of the slider 20.

When the knob 50 is moved in the X direction, since the pressing portion 31a is weakly fit together with the grooves 21a of the sliding portion 21, this pressing portion 31a slides within the grooves 21a. As a result, the slider 20 moves in the X direction.

Figure 4:
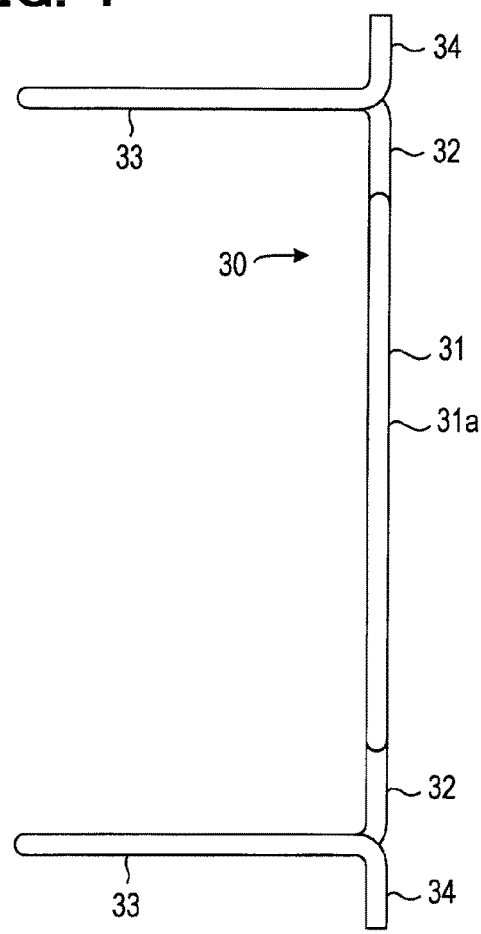
FIG. 4(a) is a top view of the stabilizer.
FIG. 4(b) is a front view of the stabilizer.
FIG. 4(c) is a side view of the stabilizer.
Figure 4:
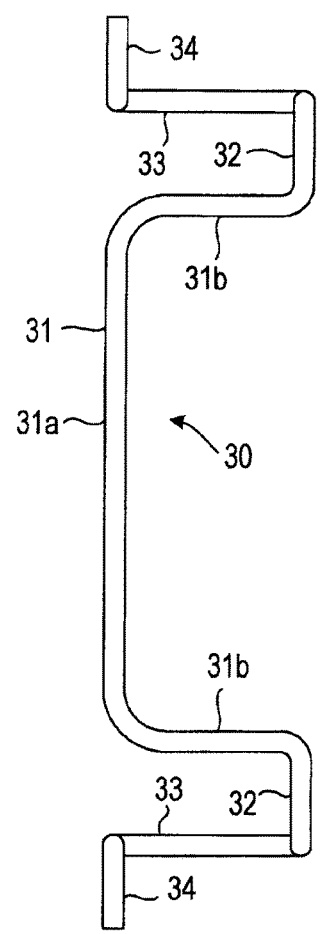
Figure 4:
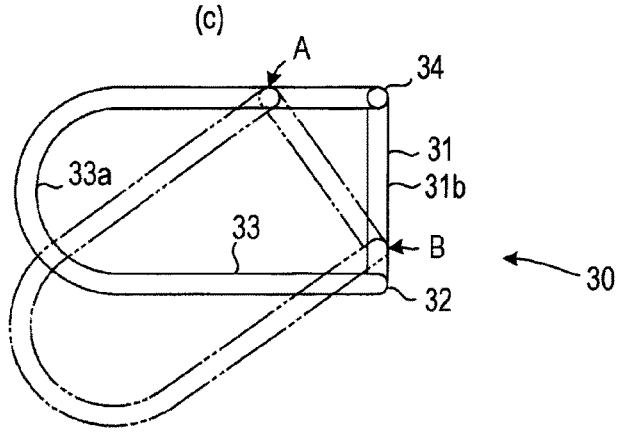

When the knob 50 is moved in the Y direction, the pressing portion 31a of the stabilizer 30 moves in the Y direction. At this time, this pressing portion 31a is weakly fit together with the grooves 21a of the sliding portion 21. Further, the link portions 32 of the stabilizer 30 are housed in the fitting grooves 12a of the base 10. The link portions 32 are restricted from moving in the Y direction, and are freely movable in the Z direction. Accordingly, as shown in FIG. 4(c), the stabilizer 30 rotates about the pressing portion 31a, and the pressing portion 31a moves to position A without height change. Conversely, due to this rotation, the link portions 32 move in the Z direction to position B in the fitting grooves 12a. Accordingly, the slider 20 moves in the Y direction.

Next, effects of the movable structure 1 will be explained. Further, for easy understanding of this explanation, a movable structure of a reference example will be explained with reference to FIGS. 5(a) and 5(b).

Figure 5:
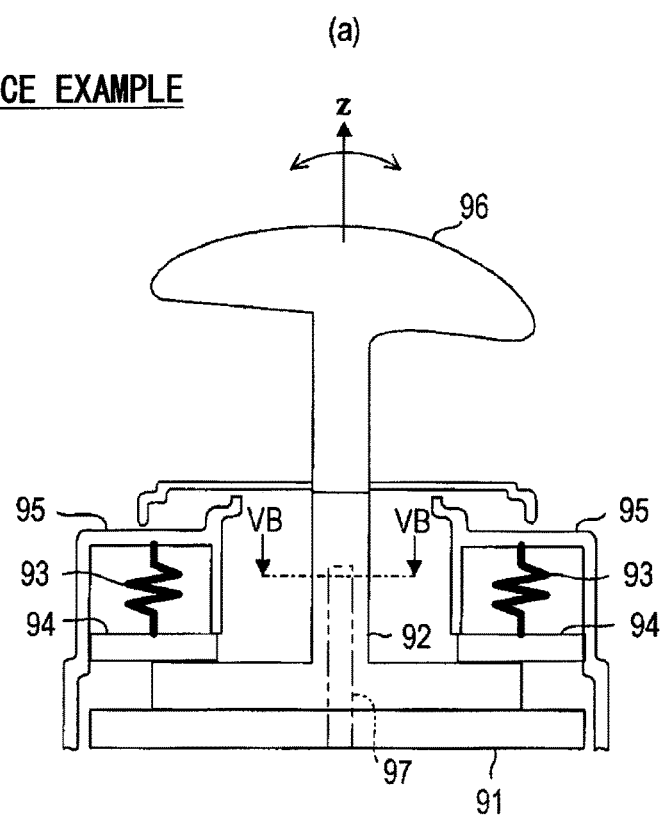
FIG. 5 is an explanatory drawing showing a remote control device movable structure according to a reference example.
Figure 5:
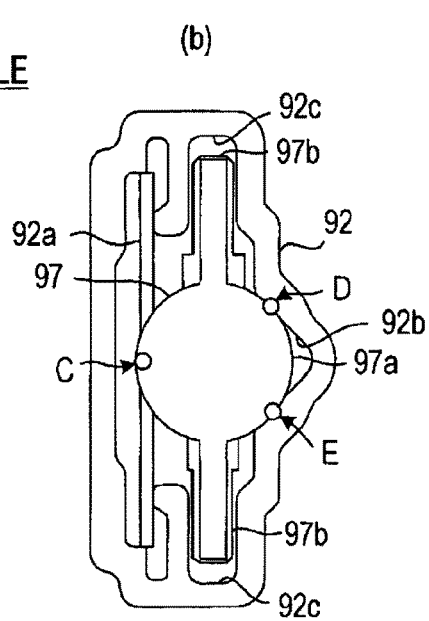

As shown in FIG. 5(a), when a slider 92, which is connected to a knob 96, is caused to slide on a base 91, springs 93 are used to suppress play. In other words, elastic force from the springs 93 is used to press on the slider 92 via the pressing plates 94. Specifically, one end of the springs 93 is attached to the pressing plates 94, and the other end is attached to a cover 95. Accordingly, for the pitch direction about the X axis and the roll direction about the Y axis as shown in FIG. 1(a), play can be suppressed. However, this case, with respect to the slider 92 which is rectangular shaped when viewed from the top, typically requires four locations each having a structure including a spring 93, a pressing plate 94, and a cover 95 (at a minimum, three locations are required). Accordingly, the number of components may become large.

Further, as shown in FIG. 5(b), an end portion of the shaft 97 is formed by a sphere-shaped sphere member 97a and pin members 97b that project horizontally from the sphere member 97a. At the slider 92, a leaf spring 92a is provided in a cavity that houses the shaft 97. The leaf spring 92a abuts a bottom portion of the sphere member 97a, and biases the sphere member 97a toward a recess 92b. Accordingly, the sphere member 97a is gripped at the three illustrated points C, D, and E. Further, the pin members 97b are housed within side recesses 92c which are shaped to fit the pin members 97b. Accordingly, for the yaw direction about the Z axis shown in FIG. 1(a), play can be suppressed.

Conversely, in the present embodiment, the sliding portion 21 of the slider 20 slides on the sliding surfaces 10a formed on top of the base 10. Then, the slider 20 is biased toward the base 10 by the stabilizer 30 which is formed by a small-diameter, rod-shaped, elastic member. Specifically, the stabilizer 30 is formed by the center portion 31, the link portions 32, the spring portions 33, and the abutting portions 34. Then, the abutting portions 34 are biased toward the base 10 by abutting the abutting recesses 40a of the cover 40, which is attached over the slider 20. Consequently, the spring portions 33 elastically deform about the arc portions 33a. Due to a reaction force resulting from the elastic deformation by the spring portions 33, the sliding portion 21 of the slider 20 is biased toward the base 10 by the pressing portion 31a formed by the center portion 31.

In other words, by interposing a single component (i.e., the stabilizer 30) between the cover 40 and the slider 20, the slider 20 is pressed down toward the base 10. Accordingly, with a small number of components, play can be suppressed in the pitch direction about the X axis and the roll direction about the Y axis.

Further, in the present embodiment, the two ends of the sliding portion 21 of the slider 20 are positioned within the substantially U-shaped center portion 31. Then, the pressing portion 31a, which is formed by the center portion 31, traverses the sliding portion 21 in the X direction. In other words, the pressing portion 31a is shaped as a straight line traversing the top surface of the sliding portion 21 in a first direction (the X direction). Accordingly, sufficient biasing force may be obtained from one stabilizer 30.

In the present embodiment, the slider 20 is biased toward the base 10 by two stabilizers 30. In other words, two stabilizers 30 are provided such that a respective pressing portion 31a is positioned on the surface of each end of the sliding portion 21 in a second direction (the Y direction) orthogonal to the first direction (the X direction). Accordingly, with a smaller number of components, play can be suppressed in the pitch direction about the X axis and the roll direction about the Y axis.

Even further, in the present embodiment, the stabilizer 30 is arranged so that the pressing portion 31a is weakly fit together with the grooves 21a of the sliding portion 21 (see FIG. 2). In other words, the pressing portion 31a is weakly fit together with the grooves 21a formed on the top surface of the sliding portion 21. Accordingly, without providing the pin members 97b at the shaft 97 of the reference example, play can be suppressed in the yaw direction about the Z axis.

Further, in the present embodiment, when the knob 50 is moved in the X direction, the pressing portion 31a of the stabilizer 30 is weakly fit together with the grooves 21a of the sliding portion 21. Accordingly, the pressing portion 31a slides within the grooves 21a, and the slider 20 moves in the X direction. In other words, when the sliding portion 21 moves in the first direction (the X direction), the pressing portion 31a slides in the grooves 21a along an inner portion of the grooves 21a. Accordingly, movement operation in the X direction becomes smooth.

Even further, in the present embodiment, when the knob 50 is moved in the Y direction, the pressing portion 31a of the stabilizer 30 moves in the Y direction. At this time, as shown in FIG. 4(c), the stabilizer 30 rotates about the pressing portion 31a, and the pressing portion 31a moves to position A without height change. In other words, when the sliding portion 21 slides in the second direction (the Y direction), the pressing portion 31a moves, as a result of the stabilizer 30 tilting, in the second direction (the Y direction) without height change. Accordingly, movement operation of the knob 50 in the Y direction becomes smooth.

At this time, the pressing portion 31a and the abutting portions 34 are positioned coaxially (i.e., on the same straight line). In other words, the abutting portions 34 are formed, via the spring portions 33, coaxially with the pressing portion 31a. Accordingly, the abutting recesses 40a of the cover 40 bias the abutting portions 34 with a fixed biasing force, and as a result, biasing force against the slider 20 does not change. Due to this point as well, movement operation of the knob 50 in the Y direction becomes smooth.

The present disclosure is not intended to be limited to the above described embodiment(s), and a variety of embodiments are contemplated given these embodiments do not depart form the technical scope of the present disclosure.

The invention claimed is:
1. A remote control device movable structure, comprising:
a base having a sliding surface at an upper portion thereof;
a slider including
  a sliding portion that abuts the sliding surface of the base, and
  a fitting portion that stands on the sliding surface and fits together with a shaft protruding from the base;
a cover attached over the slider to allow the fitting portion to protrude; and
a stabilizer formed by an elastic, rod-shaped member, wherein
the stabilizer includes
  an abutting portion that abuts the cover while being biased by the cover,
  a spring portion that is connected to the abutting portion, the spring portion elastically deforming due to a bias applied by the cover to the abutting portion, and
  a pressing portion that is connected to the spring portion, the pressing portion biasing the slider toward the base due to a reaction force resulting from the elastic deformation of the spring portion, wherein
each of the abutting portion and the pressing portion has a longitudinal axis, and the longitudinal axis of the abutting portion and the longitudinal axis of the pressing portion are coaxial,
the spring portion is formed in a U-shape and extends orthogonally to the longitudinal axis of the abutting portion and the longitudinal axis of the pressing portion, and
the abutting portion is spaced apart from the pressing portion in the direction of the longitudinal axis of the pressing portion.
2. A remote control device movable structure, comprising:
a base having a sliding surface at an upper portion thereof;
a slider including
  a sliding portion that abuts the sliding surface of the base, and
  a fitting portion that stands on the sliding surface and fits together with a shaft protruding from the base;
a cover attached over the slider to allow the fitting portion to protrude; and
a stabilizer formed by an elastic, rod-shaped member, wherein
the stabilizer includes
  an abutting portion that abuts the cover while being biased by the cover,
  a spring portion that is connected to the abutting portion, the spring portion elastically deforming due to a bias applied by the cover to the abutting portion, and
  a pressing portion that is connected to the spring portion, the pressing portion biasing the slider toward the base due to a reaction force resulting from the elastic deformation of the spring portion, wherein
each of the abutting portion and the pressing portion has a longitudinal axis, and the longitudinal axis of the abutting portion and the longitudinal axis of the pressing portion are coaxial, the spring portion is formed in a U-shape and extends orthogonally to the longitudinal axis of the abutting portion and the longitudinal axis of the pressing portion, the pressing portion is shaped as a straight line traversing a top surface of the sliding portion in a first direction, the elastic, rod-shaped member is a first elastic, rod-shaped member, the stabilizer is a first stabilizer, the abutting portion is a first abutting portion, the spring portion is a first spring portion and the pressing portion is a first pressing portion, the remote control device includes a second stabilizer, which is formed by a second elastic, rod-shaped member, wherein the second stabilizer includes:

a second abutting portion that abuts the cover while being biased by the cover, a second spring portion that is connected to the abutting portion, the second spring portion elastically deforming due to a bias applied by the cover to the second abutting portion, and a second pressing portion that is connected to the second spring portion, the second pressing portion biasing the slider toward the base due to a reaction force resulting from the elastic deformation of the second spring portion, and the first and second stabilizers are arranged such that the first and second pressing portions are respectively positioned on the top surface of each of two opposite ends of the sliding portion, and the two opposite ends are separated from one another along a second direction, which is orthogonal to the first direction.

3. The remote control device movable structure of claim 2, wherein the pressing portion is fitted together with a groove formed on the top surface of the sliding portion.

4. The remote control device movable structure of claim 3, wherein when the sliding portion moves in the first direction, the pressing portion slides along the groove in an inner portion of the groove.

5. The remote control device movable structure of claim 3, wherein when the sliding portion slides in the second direction, which is orthogonal to the first direction, the pressing portion moves, as a result of the stabilizer tilting, in the second direction without height change.

6. The remote control device movable structure of claim 2, wherein the stabilizer has a longitudinal axis, and the abutting portion, the pressing portion and the spring portion are spaced apart from one another in the direction of the longitudinal axis of the stabilizer.

* * * * *